Patented Jan. 9, 1934

1,943,008

UNITED STATES PATENT OFFICE 1,943,008

TREATMENT OF CELLULOSE DERIVATIVES

George Holland Ellis and Ralph James Mann, Spondon, near Derby, England, assignors to Celanese Corporation of America, a corporation of Delaware No Drawing. Application July 14, 1927, Serial No. 205,836, and in Great Britain April 14, 1927

8 Claims. (Cl. 8—5)

This invention relates to the printing and stencilling of threads, yarns, knitted or woven fabrics, or other products made of or containing cellulose acetate or other organic acid esters of cellulose, such for example as cellulose formate, propionate or butyrate, or the products obtained by the treatment of alkalized cellulose with sulpho-chlorides (e. g. the product known as "immunized cotton" obtained by treatment with p-toluene sulpho-chloride), or made of or containing cellulose ethers, such as methyl, ethyl or benzyl cellulose, or the corresponding condensation products of cellulose and glycols or other polyhydric alcohols, all of which cellulose derivatives are hereinafter referred to as organic substitution derivatives of cellulose.

U. S. Patent Nos. 1,618,413, 1,618,414, 1,694,413 and 1,690,481 and U. S. application S. No. 152,517 describe inter alia processes for printing and stencilling such organic substitution derivatives of cellulose with coloring matters or organic compounds which are insoluble, practically insoluble or are of relatively low solubility in water, but in all cases the compounds or coloring matters are employed in the form of solubilized or dispersed modifications.

We have now found that very good printings and stencillings are obtainable on materials comprising organic substitution derivatives of cellulose, and particularly cellulose acetate, with simple aqueous pastes or preparations of insoluble or relatively insoluble coloring matters or organic compounds, that is to say with aqueous pastes or preparations of insoluble or relatively insoluble coloring matters or compounds in undispersed non-colloidal or insoluble form.

The coloring matters or compounds when solid are preferably finely divided. The printing pastes or stencilling preparations may be made up with any suitable thickeners, such as starch, gums, dextrin, flour and the like and applied by methods known in the printing and stencilling arts, the prints or stencillings being subsequently fixed, for example by steaming.

Any insoluble or relatively insoluble coloring matter or compound having affinity for the material under treatment may be employed for the printing or stencilling and the following may be instanced, though it is to be understood that such examples do not limit the invention in any way. Thus we may employ simple azo components e. g. p-nitraniline, m-nitraniline, benzidine, dianisidine, dimethylaniline, α-naphthylamine or diphenylamine) for application by the azoic or development process, unsulphonated or other insoluble or relatively insoluble derivatives of the "azo" class, unreduced indophenols (aryl or substituted aryl benzoquinone or naphthoquinone monoimides), unreduced anthraquinone vat dyestuffs, or insoluble or relatively insoluble coloring matters of the following classes:—polyaryl methane, oxazine, azine, thiazine, unreduced indigoid derivatives, basic anthraquinone derivatives, pyrazolone derivatives e. g. unsulphonated azo derivatives of pyrazolone compounds, nitrodiarylamines, aliphatic acidylaminoanthraquinones, or unsulphonated stilbene derivatives.

When basic coloring matters or compounds are to be employed according to the present invention they will be used in the form of the base and not in the form of salts, such as the hydrochloride.

As stated above for fixing the prints or stencillings a steaming treatment may be employed, and though good fixing is obtainable with a five minute treatment it is found that improved fastness to rubbing and depth of shade are sometimes obtainable if the steaming treatment is prolonged, say to thirty minutes.

If complete or partial delustering is required, more particularly with goods containing "dry-spun" cellulose acetate artificial silk, the steaming treatment may be carried out with moist steam. Further, prints and stencillings of enhanced beauty are obtainable with moist steam fixing, if one or more agents adapted to modify, i. e. to accentuate, diminish or prevent, the delustering action, such as mechanical resists or substances which are solvents or solutes for the cellulose acetate are added to the printing pastes or stencilling preparations, as described in U. S. applications S. No. 131,104 and S. No. 192,159 (corresponding respectively to British Patent No. 266,777 and British Patent No. 277,414). Examples of such solvent or solute of such luster modifying agents are: aromatic amines and substituted amines such as analine, chloranilines, alkylanilines, toluidines, anisidines and the like; hydroxy bodies of the aromatic series, for instance phenol, cresols, resorcine, catechol, naphthols, chlorphenols, chlor naphthols and the like; arylhalides and alkylhalides, for instance chlorbenzene, chlornaphthalenes, tetrachlorethane, trichlorethylene, and the like; hydroxy bodies of the aliphatic series, for instance glycerine, alcohols, or chlorinated derivatives such as epichlorhydrin; esters, for instance aceto acetic ester; aldehydes for instance benzaldehyde; ketones for instance acetone; cyclic bases, for instance pyridine or quinoline; hydrogenated hydrocarbons and hydrogenated phenols for example hexahydrophenal, hexahydrobenzene, tetrahydronaphthalene and the like; mono or poly basic carboxylic acids of the aliphatic series and substituted derivatives thereof such as halogen derivatives, amino derivatives, hydroxy derivatives, for example, formic, acetic, propionic, butyric, chloracetic, aminoacetic, glycollic, lactic, citric and succinic acids. For example if a fabric composed of dry spun cellulose acetate artificial silk is printed with an aqueous paste containing an insoluble dyestuff, a thickener and a substance adapted to prevent or diminish the delustering action and the fabric is then subjected to the delustering action of moist steam, a lustrous colored design is obtained on a partially or completely delustered ground and it is found that in consequence the design appears to stand out from the fabric much more boldly than if the differential lustre effect were not present.

The following examples are intended to illustrate the invention and not to be in any way limitative.

Example 1

1.5 parts by weight of the dyestuff obtained by coupling diazotized aniline with phenyl-methyl-pyrazolone and having the following structural formula:

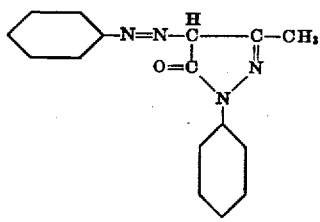

is ground into a smooth paste with about 10 times its weight of cold water. This paste is stirred with 12 parts by weight of wheat starch, and when a smooth thin paste is produced the whole is poured with agitation into sufficient boiling water to bring the total weight to 100 parts, boiling being continued for a further 5 minutes. This printing paste is allowed to cool and printed on to a fabric composed of or containing cellulose acetate.

The print is dried, steamed 30 minutes, washed and finished as required, giving a bright pure yellow print.

Example 2

The azodyestuff formed by coupling diazotized m-nitro-p-toluidine with dimethylaniline and having the following structural formula:

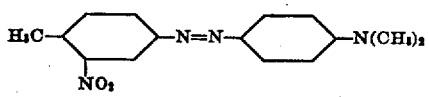

is made into a 10% aqueous paste, e. g. by grinding with water. A printing paste is then made of the following composition:—

| | Parts by weight |
|---|---|
| 10% color paste | 1.0 |
| Wheat starch | 12.0 |
| Water | 87.0 |
| | 100.0 |

The starch is conveniently stirred into a thin smooth paste with the color and the whole added to the boiling water.

A cellulose acetate woven fabric is printed with the cooled paste, dried and "aged" for 5 minutes with wet and dry bulbs showing respectively 212° F. and 218° F. A light soaping is then given and the fabric dried and finished as required. The printed portions are bright orange in shade.

Example 3

1.5 parts by weight of 2:4-dinitro-4'-methoxy-diphenyl-amine are made into a smooth paste with 13.5 parts of cold water and 12.0 parts wheat starch. The whole is poured into 73 parts of boiling water with continuous agitation, boiling being continued until homogeneous. The paste is then cooled. A cellulose acetate fabric printed with this paste dried, and steamed for 5-30 minutes, followed by the usual washing and finishing gives prints having the design in a yellow shade.

Example 4

A 10% aqueous paste of 1:4-dimethylamino-anthraquinone is made by grinding, precipitating or other known means. 5.0 parts by weight of this paste are added with 62 parts of cold water to 3 parts by weight of powdered gum obtained from the careb seed, the whole being thoroughly agitated until the gum is swollen. The temperature is then raised to boiling with agitation and maintained until a homogeneous mucilage is obtained. It is then cooled to 60° C. when 30 parts by weight of citric acid are added, the temperature being maintained at 60° C. just sufficiently long to allow of complete solution, after which the paste is cooled.

A fabric consisting wholly or partly of cellulose acetate is printed with this paste, and dried. The print is steamed for 10 minutes under conditions showing wet and dry bulb readings of 212° F. and 218° F. respectively. Gum is then removed by light soaping, and the print finished as required.

The printed portion of the fabric is delustered and bright blue in shade.

Example 5

1.5 parts by weight of benzidine are boiled with 44.5 parts of water, added to 54.0 parts of 50% gum arabic solution and maintained at 90-95° C. for ½ hour, after which the whole is cooled and strained. A fabric containing cellulose acetate is printed with this paste and dried. The print is steamed for 15 minutes under a pressure of 5 lbs. per square inch, and then washed free from gum in cold water.

The print is then diazotized by treatment for ¼ hour cold in

| | Parts by weight |
|---|---|
| Sodium nitrite | 1 |
| HCl (30%) | 4 |
| Water | 400 |

After diazotizing, the print is rinsed thoroughly and developed in

| | Parts by weight |
|---|---|
| Dimethylaniline | 0.5 |
| Turkey red oil | 5.0 |
| Water | 94.5 |
| | 100.0 |

The dimethylaniline is thoroughly mixed with the Turkey red oil with or without application of heat, and the mixture added with agitation to the water. Development is continued for 1½ hours in the cold, after which the print is soaped, rinsed and finished as required. The shade of the printed portions is bright orange.

The phrase aqueous preparations of relatively insoluble coloring compounds used hereinafter in the claims is to be understood to include aqueous pastes or preparations of insoluble or relatively insoluble dyestuffs and in addition aqueous pastes or preparations of insoluble or relatively insoluble azo components (amino bases or developers) for use in azoic or development printing or stencilling, while the term printing in the claims includes also stencilling.

What we claim and desire to secure by Letters Patent is:—

1. Process for printing materials comprising cellulose acetate to obtain differential color and luster effects, comprising applying thereto aqueous preparations of relatively water insoluble coloring compounds in non-colloidal form, said preparations also containing agents adapted to modify the delustering action of moist steam, and then steaming with moist steam.

2. Process for printing materials comprising organic substitution derivatives of cellulose to obtain differential color and luster effects, comprising applying thereto aqueous preparations of relatively water insoluble coloring compounds in noncolloidal form, said preparations also containing agents adapted to modify the delustering action of moist steam, and then steaming with moist steam.

3. Process for obtaining full prints upon materials comprising organic substitution derivatives of cellulose, comprising printing the same with aqueous preparations containing in undispersed form relatively water-insoluble unreduced anthraquinone vat dyes having affinity for the goods, and fixing the coloring compounds by steaming.

4. Process for obtaining full prints upon materials comprising cellulose acetate, comprising printing the same with aqueous preparations containing in undispersed form relatively water-insoluble unreduced anthraquinone vat dyes having affinity for the goods, and fixing the coloring compounds by steaming.

5. Process for obtaining full prints upon materials comprising organic substitution derivatives of cellulose, comprising printing the same with an aqueous paste containing a thickener and containing in non-colloidal form a relatively water-insoluble organic coloring compound unreduced anthraquinone vat dye having affinity for the goods, fixing the coloring compound thereon by steaming, and then removing substantially all the thickener.

6. Process for obtaining full prints upon materials comprising cellulose acetate, comprising printing the same with an aqueous paste containing a thickener and containing in non-colloidal form a relatively water-insoluble unreduced anthraquinone vat dye having affinity for the goods, fixing the coloring compound thereon by steaming, and then removing substantially all the thickener.

7. Process for obtaining full prints upon materials comprising organic substitution derivatives of cellulose, comprising printing the same with aqueous paste containing in non-colloidal form a relatively water-insoluble unreduced anthraquinone vat dye having affinity for the goods and containing a non-coagulatable substance as the sole constituent of the thickener, and fixing the coloring compound by steaming.

8. Process for obtaining full prints upon materials comprising cellulose acetate, comprising printing the same with aqueous pastes containing in non-colloidal form a relatively water-insoluble unreduced anthraquinone vat dye having affinity for the goods and containing a non-coagulatable substance as the sole constituent of the thickener, and fixing the coloring compound by steaming.

GEORGE HOLLAND ELLIS.
RALPH JAMES MANN.

CERTIFICATE OF CORRECTION.

Patent No. 1,943,008.                         January 9, 1934.

GEORGE HOLLAND ELLIS, ET AL.

It is hereby certified that error appears in the printed specification of the above numbered patent requiring correction as follows: Page 3, line 84, claim 5, strike out the words "organic coloring compound"; and that the said Letters Patent should be read with this correction therein that the same may conform to the record of the case in the Patent Office.

Signed and sealed this 20th day of February, A. D. 1934.

(Seal)

F. M. Hopkins
Acting Commissioner of Patents.

rinsed and finished as required. The shade of the printed portions is bright orange.

The phrase aqueous preparations of relatively insoluble coloring compounds used hereinafter in the claims is to be understood to include aqueous pastes or preparations of insoluble or relatively insoluble dyestuffs and in addition aqueous pastes or preparations of insoluble or relatively insoluble azo components (amino bases or developers) for use in azoic or development printing or stencilling, while the term printing in the claims includes also stencilling.

What we claim and desire to secure by Letters Patent is:—

1. Process for printing materials comprising cellulose acetate to obtain differential color and luster effects, comprising applying thereto aqueous preparations of relatively water insoluble coloring compounds in non-colloidal form, said preparations also containing agents adapted to modify the delustering action of moist steam, and then steaming with moist steam.

2. Process for printing materials comprising organic substitution derivatives of cellulose to obtain differential color and luster effects, comprising applying thereto aqueous preparations of relatively water insoluble coloring compounds in noncolloidal form, said preparations also containing agents adapted to modify the delustering action of moist steam, and then steaming with moist steam.

3. Process for obtaining full prints upon materials comprising organic substitution derivatives of cellulose, comprising printing the same with aqueous preparations containing in undispersed form relatively water-insoluble unreduced anthraquinone vat dyes having affinity for the goods, and fixing the coloring compounds by steaming.

4. Process for obtaining full prints upon materials comprising cellulose acetate, comprising printing the same with aqueous preparations containing in undispersed form relatively water-insoluble unreduced anthraquinone vat dyes having affinity for the goods, and fixing the coloring compounds by steaming.

5. Process for obtaining full prints upon materials comprising organic substitution derivatives of cellulose, comprising printing the same with an aqueous paste containing a thickener and containing in non-colloidal form a relatively water-insoluble organic coloring compound unreduced anthraquinone vat dye having affinity for the goods, fixing the coloring compound thereon by steaming, and then removing substantially all the thickener.

6. Process for obtaining full prints upon materials comprising cellulose acetate, comprising printing the same with an aqueous paste containing a thickener and containing in non-colloidal form a relatively water-insoluble unreduced anthraquinone vat dye having affinity for the goods, fixing the coloring compound thereon by steaming, and then removing substantially all the thickener.

7. Process for obtaining full prints upon materials comprising organic substitution derivatives of cellulose, comprising printing the same with aqueous paste containing in non-colloidal form a relatively water-insoluble unreduced anthraquinone vat dye having affinity for the goods and containing a non-coagulatable substance as the sole constituent of the thickener, and fixing the coloring compound by steaming.

8. Process for obtaining full prints upon materials comprising cellulose acetate, comprising printing the same with aqueous pastes containing in non-colloidal form a relatively water-insoluble unreduced anthraquinone vat dye having affinity for the goods and containing a non-coagulatable substance as the sole constituent of the thickener, and fixing the coloring compound by steaming.

GEORGE HOLLAND ELLIS.
RALPH JAMES MANN.

---

CERTIFICATE OF CORRECTION.

Patent No. 1,943,008.            January 9, 1934.

GEORGE HOLLAND ELLIS, ET AL.

It is hereby certified that error appears in the printed specification of the above numbered patent requiring correction as follows: Page 3, line 84, claim 5, strike out the words "organic coloring compound"; and that the said Letters Patent should be read with this correction therein that the same may conform to the record of the case in the Patent Office.

Signed and sealed this 20th day of February, A. D. 1934.

F. M. Hopkins
(Seal)            Acting Commissioner of Patents.